UNITED STATES PATENT OFFICE.

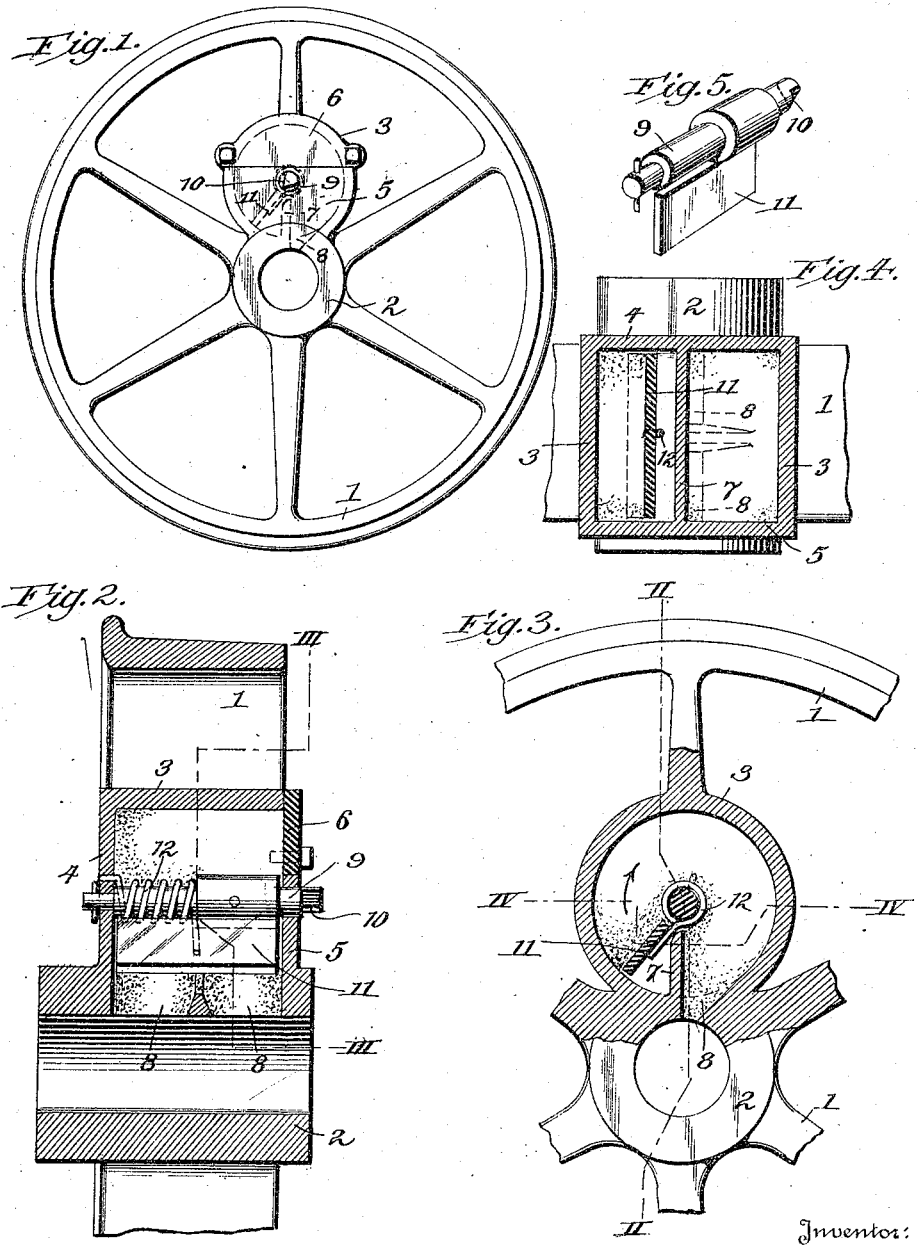

FRANK C. SNYDER, OF SCOTTDALE, PENNSYLVANIA.

LUBRICATOR.

1,286,817.  Specification of Letters Patent.  Patented Dec. 3, 1918.

Application filed November 22, 1917. Serial No. 203,411.

*To all whom it may concern:*

Be it known that I, FRANK C. SNYDER, a citizen of the United States, residing at Scottdale, in the county of Westmoreland and State of Pennsylvania, have invented a certain new and useful Improvement in Lubricators, of which the following is a specification.

My present invention pertains to lubricators, and more particularly to that class which is adapted for the lubrication of axles.

The object of the invention is to provide a simple structure which can be embodied in a wheel, for instance, a car-wheel, and which may be readily packed with grease and which will be self-acting to force the lubricant gradually into the bearing between the axle and the hub of the wheel.

A further object of the invention is to provide means which will indicate, upon a mere inspection of the outside of the device, the amount of grease contained within the lubricator, so that the party who is charged with the duty of filling of the lubricator may see at a glance whether the same contains a sufficient quantity of grease, or in other words, whether it needs refilling.

While the invention is shown in connection with a car-wheel, it is to be understood that it may be utilized in conjunction with any other wheel or a pulley.

In the drawings:

Figure 1 is a side elevation of a car-wheel with my invention applied thereto;

Fig. 2 a vertical sectional view on a somewhat enlarged scale, taken on the line II—II of Fig. 3;

Fig. 3 a sectional view, taken on the line III—III of Fig. 2;

Fig. 4 a horizontal sectional view, taken on the line IV—IV of Fig. 3; and

Fig. 5 a perspective view of the impeller and its supporting shaft.

1 denotes the wheel, having a series of spokes radiating from the hub 2. A chamber is formed integrally with one of the spokes, said chamber being circular in cross-section and composed of an annular wall 3, a rear wall 4, and a front wall 5, the wall 4 being coextensive of the rear portion of the chamber, while the wall 5 projects upwardly from the axle to a point slightly above the axis of the chamber, as best indicated in Figs. 1 and 2. A removable plate 6 is employed to close the upper portion of the chamber above the front wall 5, it being held in position by machine screws or other suitable means.

The chamber is provided with a cross partition 7 (Figs. 3 and 4), which wall or partition extends radially from the hub and stops short of the center of the chamber. To one side of the lower portion of the partition 7, openings 8 extend from the chamber to the inner face of the hub, whereby grease or lubricant may pass from the chamber or reservoir directly against the axle (not shown) which extends into the hub 2.

A shaft 9 is mounted in alined bearings formed in the walls 4 and 5, said shaft being centrally disposed within the chamber. The forward end of said shaft is provided with flat faces whereby a wrench may be applied thereto, said faces converging and forming an index or pointer, as 10 (Fig. 1).

Secured to and rotatable with the shaft is a wing or blade 11, said blade extending from side to side of the chamber and having only a slight clearance between the walls 4 and 5 and the inner face of the annular wall 3. A spring 12 encircles the shaft, one end of the spring bearing upon the impeller blade 11, while the opposite end extends into an opening formed in the wall 4. The spring normally tends to rotate the impelling blade away from the wall or partition 7, and consequently will force the lubricant in front of the same around in the chamber and out through the openings 8. Inasmuch as the index or pointer 10 and the impeller blade 11 are in alinement, one can readily note without opening the lubricator the exact amount of lubricant contained within the chamber.

If need be, in warm weather, the openings 8 may be stuffed with wicking or waste, to prevent the lubricant from passing too freely from the chamber under the action of the impelling blade 11 though, of course, this may be regulated by using greases of different consistencies according to the time of the year. In cold weather such wicking would not be necessary.

Having thus described my invention, what I claim is:

1. In combination with a wheel having a lubricating chamber, said chamber opening through the wall of the hub; and a spring-pressed impeller rotatably mounted within the chamber and serving to force the lubricant outwardly through the opening.

2. In combination with a wheel having a cylindrical chamber, said chamber having an opening extending therefrom through the hub of the wheel; a fixed partition extending into the chamber to one side of the opening; and a spring-pressed impeller rotatably mounted within the chamber and serving to force lubricant around within the chamber and out through the opening.

3. In combination with a wheel having a chamber, said chamber having an opening extending therefrom through the hub of the wheel; a partition extending into the chamber from side to side and to one side of the opening; a spring-actuated impeller rotatably mounted within the chamber; and an index or pointer movable with the impeller for indicating the position thereof.

4. In combination with a wheel having a cylindrical chamber adjacent the hub of the wheel and having an opening extending therefrom through the hub; a removable closure for the chamber; a shaft mounted within the chamber; an impeller secured to and rotatable with the shaft; and a spring serving to rotate the shaft and impeller, to thereby force the lubricant in front thereof around in the chamber and out through the opening extending from the hub.

5. In combination with a wheel having a cylindrical chamber formed as an integral portion thereof, the axis of the chamber lying parallel to the axis of the wheel, and the chamber having an opening extending from the side thereof through the hub of the wheel; a radially-disposed partition extending from the hub upwardly into the chamber and stopping short of the center thereof; a shaft mounted in the end walls of the chamber in axial alinement with the center of the chamber, one end of the shaft being fashioned to form a pointer; an impeller secured to the shaft within the chamber, said impeller making a relatively close fit with the end walls and the inner cylindrical face of the chamber; and a spring serving to rotate the shaft and impeller to force the lubricant around within the chamber and outwardly through the opening in the hub.

In testimony whereof I have signed my name to this specification.

FRANK C. SNYDER.

Copies of this patent may be obtained for five cents each, by addressing the "Commissioner of Patents, Washington, D. C."